(12) United States Patent
Hsiao et al.

(10) Patent No.: US 11,316,214 B2
(45) Date of Patent: Apr. 26, 2022

(54) WASTE LITHIUM BATTERY RECOVERY SYSTEM

(71) Applicant: YAU FU INDUSTRY CO., LTD., New Taipei (TW)

(72) Inventors: Ruei-Chang Hsiao, New Taipei (TW); Ying-Chi Wang, New Taipei (TW)

(73) Assignee: YAU FU INDUSTRY CO., LTD., New Taipei (TW)

( * ) Notice: Subject to any disclaimer, the term of this patent is extended or adjusted under 35 U.S.C. 154(b) by 359 days.

(21) Appl. No.: 16/722,059

(22) Filed: Dec. 20, 2019

(65) Prior Publication Data

US 2021/0194075 A1 Jun. 24, 2021

(51) Int. Cl.
*H01M 10/54* (2006.01)
*H01M 10/0525* (2010.01)

(52) U.S. Cl.
CPC ....... *H01M 10/54* (2013.01); *H01M 10/0525* (2013.01)

(58) Field of Classification Search
CPC . H01M 10/54; Y02W 30/84; B03B 2009/066; Y02P 10/20
See application file for complete search history.

(56) References Cited

U.S. PATENT DOCUMENTS

| | | | | |
|---|---|---|---|---|
| 5,284,503 A * | 2/1994 | Bitler | ........................ | A62D 3/40 |
| | | | | 75/693 |
| 5,439,498 A * | 8/1995 | Bitler | ..................... | B09C 1/067 |
| | | | | 75/693 |
| 5,632,863 A * | 5/1997 | Meador | ................... | C10B 53/00 |
| | | | | 201/3 |
| 10,270,139 B1 * | 4/2019 | Deak | .................... | C22B 21/0069 |
| 2006/0275652 A1 * | 12/2006 | Hageluken | ............ | C22B 11/026 |
| | | | | 429/49 |
| 2008/0050295 A1 * | 2/2008 | Uchida | ................... | C22B 26/12 |
| | | | | 423/179.5 |
| 2020/0078796 A1 * | 3/2020 | Kochhar | ................. | C22B 47/00 |

FOREIGN PATENT DOCUMENTS

| | | |
|---|---|---|
| CN | 108110366 A | 6/2018 |
| CN | 207938750 U | 10/2018 |
| CN | 109994794 A | 7/2019 |

* cited by examiner

*Primary Examiner* — Imran Akram
(74) *Attorney, Agent, or Firm* — Karin L. Williams; Alan D. Kamrath; Mayer & Williams PC

(57) ABSTRACT

A waste lithium battery recovery system includes a feeding device, a steam generating device, a supercharger, a water ion generating device, a lithium battery processing device, a condensate tank, a plasma exhaust device, and a recovery processing device. In practice, the steam generating device produces saturated steam. The supercharger heats the saturated steam into superheated steam. The water ion generating device transforms the superheated steam into water ions. The lithium battery processing device performs reactions of molecular scission, pyrolysis and carbonization, and electrolytes and separators of the waste lithium batteries are treated by the water ions to form carbon residues, gas-liquid wastes, and inorganic wastes. The gas-liquid wastes are processed by the condensate tank and the plasma exhaust device to form harmless gases and liquids. The inorganic wastes are processed by the recovery processing device to produce the metals.

9 Claims, 1 Drawing Sheet

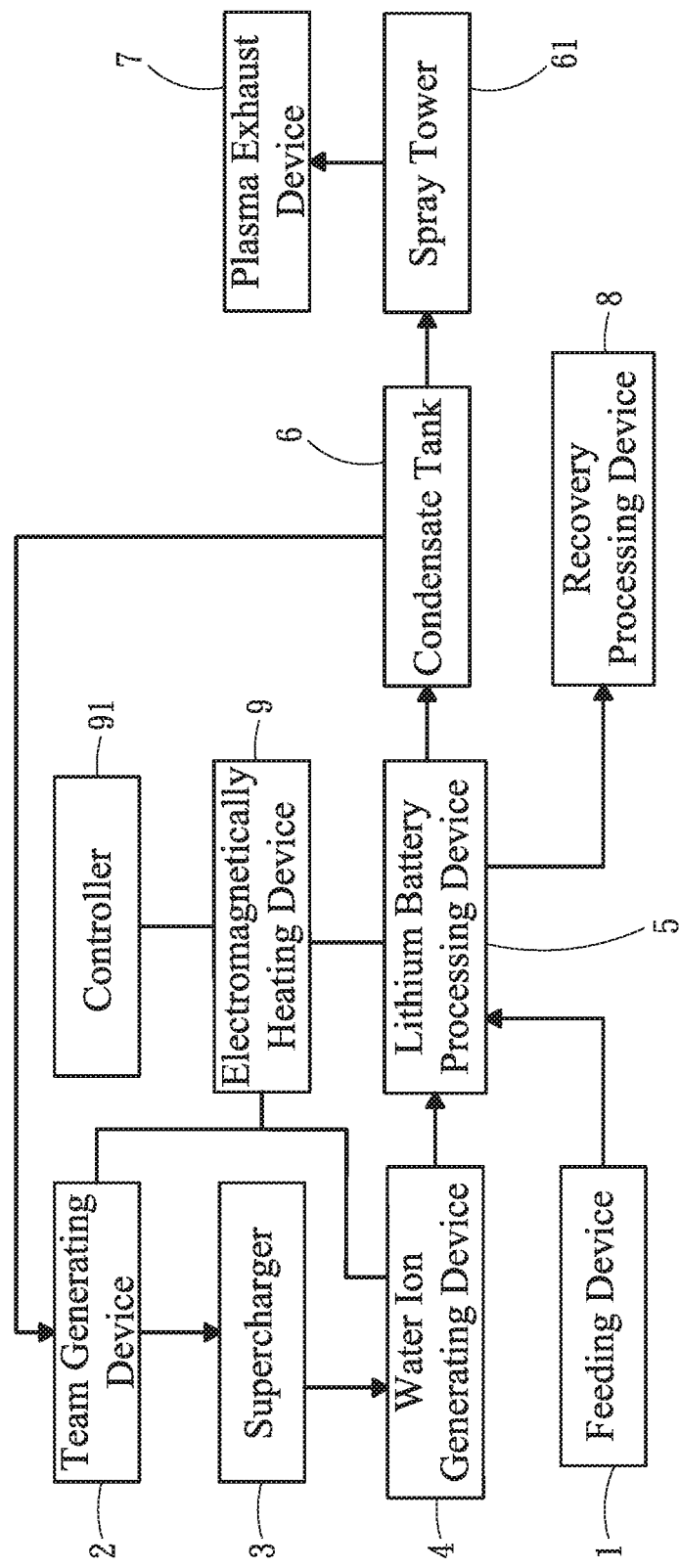

WASTE LITHIUM BATTERY RECOVERY SYSTEM

BACKGROUND OF THE INVENTION

1. Field of the Invention

The present invention relates to a battery recovery system and, more particularly, to a waste lithium battery recovery system.

2. Description of the Related Art

A conventional immersion dissolution technology is used to process waste lithium batteries which are immersed in an acid immersion solution that is heated to a determined temperature. The metallic matters in the waste lithium batteries are dissolved by a solvent are transformed into an ion state, and are stored in the immersion solution. However, the heating speed is too slow, and the reaction time of the immersion process is too long. To maintain the temperature for a long time requires considerable energy. At the same time, the treatment process is accompanied by a large amount of waste water, waste gases, and solid waste, thereby easily causing secondary pollution to the environment.

A conventional method of recovering a lithium battery includes cooling the lithium battery with liquid nitrogen or liquid argon to reduce the reaction kinetics of the lithium battery. After crushing, the metals contained in the lithium battery are dissolved with a strong alkaline solution and/or a strong acid solution. In addition, when the lithium battery is placed in a liquid solution, the metals in the lithium battery are reacted to generate hydrogen. After the hydrogen is ignited, the combustible materials can be burned out, and the residue can be recycled. However, the above method has to use a large amount of strong acid or strong alkali solution, and many exhaust gases are generated during the reaction, such as carbon dioxide that is produced by igniting the hydrogen.

Another conventional method of recovering a lithium battery includes burning the waste lithium battery at a high temperature of about several hundred degrees. Then, the burned waste lithium battery is taken out and crushed. Then, the valuable metals are collected by using hydrometallurgy or electroplating. However, the above method produces a large amount of waste gas, waste liquid and waste matters, thereby easily causing secondary pollution to the environment.

A conventional waste battery treatment system was disclosed in the China Patent Publication No. CN207938750U, wherein the lithium battery directly enters the furnace without having to be broken. The copper and aluminum liquids are used. Various harmful gases are gathered and burned to form inorganic gases with small molecules. However, the lithium battery is a multi-layered structure, such that it is necessary to crush the lithium battery to process the electrolyte that is contained in the lithium battery.

A conventional waste lithium battery processing method was disclosed in the China Patent Publication No. CN108110366A, wherein a thermal cracking furnace is used to process the waste lithium battery so as to decompose the organic components of the waste lithium battery by thermal decomposition. Then, pollutant gas produced during the heating process is captured. However, the exhaust gas generated during the recovery process cannot be completely processed through a simple high-temperature heating. In particular, some of the exhaust gases have flame resistance and some have extremely high decomposition stability. Thus, the recovery process is slow.

A conventional waste lithium battery crack processing system was disclosed in the China Patent Publication No. CN109994794A, and comprises a box for placing a waste lithium ion battery. The processing system also comprises a low temperature bucket, a medium temperature bucket, a high temperature bucket, and a cooling bucket that are sequentially sealed. The low temperature bucket, the medium temperature bucket, the high temperature bucket, and the cooling bucket are respectively provided with an air inlet and an air outlet, and the box is placed in the low temperature bucket, the medium temperature bucket, the high temperature bucket, and the cooling bucket, respectively. However, the low temperature bucket, the medium temperature bucket, the high temperature bucket, and the cooling bucket occupy a considerable amount of space, and are not convenient for maintenance and repair. In addition, when the low temperature bucket, the medium temperature bucket, the high temperature bucket, and the cooling bucket are connected together, the airtightness and thermal isolation are not enough, such that the harmful substances produced during the cracking process of the lithium ion batteries easily leak outward.

Further, the waste lithium batteries usually include organic wastes and inorganic wastes. The organic wastes include electrolytes, nonmetallic separators, plastic outer shells or the like. The inorganic wastes include metallic matters, such as electrodes, wires, or the like. However, the various traditional waste lithium battery processing devices are not used particularly to process the electrolytes and the separators. The electrolytes and the separators are usually burned by steam at a high temperature. However, such a processing method produces a large amount of waste gas and waste liquid, thereby easily causing secondary pollution to the environment.

BRIEF SUMMARY OF THE INVENTION

The primary objective of the present invention is to provide a waste lithium battery recovery system using pyrolysis of water ions without producing pollution.

In accordance with the present invention, there is provided a waste lithium battery recovery system comprising a feeding device storing and conveying waste lithium batteries, a steam generating device generating saturated steam, a supercharger connected with the steam generating device, a water ion generating device connected with the supercharger, a lithium battery processing device connected with the feeding device and the water ion generating device respectively, a condensate tank connected with the lithium battery processing device, a plasma exhaust device connected with the condensate tank, and a recovery processing device connected with the lithium battery processing device. The waste lithium batteries of the feeding device include electrolytes and separators. The supercharger receives and heats the saturated steam of the steam generating device into a superheated steam. The water ion generating device receives, dissociates, and transforms the superheated steam of the supercharger into water ions. The lithium battery processing device receives the waste lithium batteries of the feeding device and introduces the water ions of the water ion generating device. The lithium battery processing device treats the water ions, and the electrolytes and the separators of the waste lithium batteries under an atmospheric pressure and under an approximately anaerobic state by reactions of molecular scission, pyrolysis and carbonization, to form carbon residues, gas-liquid wastes, and inorganic wastes. The condensate tank receives, cools, and separates the gas-liquid wastes of the lithium battery processing device, to produce waste water and waste gases. The plasma exhaust device receives the waste gas of the condensate tank, and dissociates the waste gases by a predetermined voltage. The recovery processing device receives, and processes the inorganic wastes of the lithium battery processing device, to produce metals.

In operation, the waste lithium batteries is delivered through the feeding device into the lithium battery processing device. the steam generating device heats water to produce the saturated steam. The saturated steam of the steam generating device is delivered into the supercharger which heats the saturated steam into the superheated steam. The superheated steam of the supercharger is delivered into the water ion generating device which dissociates, and transforms the superheated steam into the water ions. The water ions of the water ion generating device are delivered into the lithium battery processing device. The lithium battery processing device performs the reactions of molecular scission, pyrolysis and carbonization, and the electrolytes and the separators of the waste lithium batteries are treated by the water ions to form the carbon residues, the gas-liquid wastes, and the inorganic wastes. The gas-liquid wastes of the lithium battery processing device are delivered to the condensate tank, to produce the waste water and the waste gases. The waste gases are delivered into the plasma exhaust device which dissociates and burned the waste gases. The inorganic wastes of the lithium battery processing device are delivered to the recovery processing device which processes the inorganic wastes, to produce the metals.

According to the primary advantage of the present invention, the waste lithium battery recovery system satisfies the requirements of environmental protection.

According to another advantage of the present invention, the waste lithium battery recovery system satisfies will not produce pollution during the processes.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 1 is a flow chart of a waste lithium battery recovery system in accordance with the preferred embodiment of the present invention.

DETAILED DESCRIPTION OF THE INVENTION

Referring to FIG. 1, a waste lithium battery recovery system in accordance with the preferred embodiment of the present invention comprises a feeding device 1 storing and conveying waste lithium batteries, a steam generating device 2 generating saturated steam (or vapor), a supercharger 3 connected with the steam generating device 2, a water ion generating device 4 connected with the supercharger 3, a lithium battery processing device 5 connected with the feeding device 1 and the water ion generating device 4 respectively, a condensate tank 6 connected with the lithium battery processing device 5, a plasma exhaust device 7 connected with the condensate tank 6, and a recovery processing device 8 connected with the lithium battery processing device 5.

The waste lithium batteries of the feeding device 1 include organic wastes and inorganic wastes. The organic wastes include electrolytes, separators, outer shells or the like. The inorganic wastes include metallic matters, such as electrodes, wires, or the like.

Water is filled into the steam generating device 2 which heats the water to produce the saturated steam of at least 130° C. to 160° C.

The supercharger 3 receives and heats the saturated steam of the steam generating device 2 into a superheated steam.

The water ion generating device 4 receives, dissociates, and transforms the superheated steam of the supercharger 3 into water ions. The water ions includes hydrogen ion ($H^+$) and hydroxyl ion or hydroxide ion ($OH^-$).

The lithium battery processing device 5 receives the waste lithium batteries of the feeding device 1 and introduces the water ions of the water ion generating device 4. The lithium battery processing device 5 treats the water ions, and the electrolytes and the separators of the waste lithium batteries under an atmospheric (or normal) pressure and under an approximately anaerobic (or oxygen free) state by reactions of molecular scission, pyrolysis and carbonization, to form carbon residues (or dregs), gas-liquid wastes, and inorganic wastes.

In treatment, the water ions break the molecular chains of the electrolytes and the separators by means of an ion exchange during the molecular scission process. At this time, the water ions have a high temperature, such that the water ions perform the pyrolysis process and the carbonization process simultaneously during the molecular scission process, and the electrolytes and the separators are treated by the water ions to form the carbon residues. In addition, gases are produced during the processes of molecular scission, pyrolysis and carbonization. Then, the gases and the electrolytes interact with the hydrogen ion ($H^+$) of the water ions, to produce the gas-liquid wastes which include gaseous wastes and liquid wastes. It is noted that, the inorganic wastes of the waste lithium batteries are not are not affected by the reactions of molecular scission, pyrolysis and carbonization, such that the inorganic wastes are kept in the lithium battery processing device 5.

The condensate tank 6 receives, cools, and separates the gas-liquid wastes of the lithium battery processing device 5, to produce waste water and waste gases. The gaseous wastes and the liquid wastes of the gas-liquid wastes are initially cooled and then separated to produce the waste water and the waste gases respectively.

The plasma exhaust device 7 receives the waste gas of the condensate tank 6, and dissociates (or decomposes) the waste gases by a predetermined voltage.

In practice, the plasma exhaust device 7 applies a high voltage of at least 20,000 to 30,000 volts to dissociate the waste gases, and to produce an electronic flashover which causes a combustion, such that the waste gases are shocked electrically and dissociated by the plasma, and are burned in the space of the plasma exhaust device 7 due to the combustion caused by the electronic flashover. At this time, the plasma produces an $O_3$ reaction under a high pressure and a high temperature, such that the waste gases that cannot be burned are oxidated and dissociated by using $O_3$. Finally, the waste gases are drained outward when the waste gases cannot cause combustion any more.

The recovery processing device 8 receives, and processes the inorganic wastes and the carbon residues of the lithium battery processing device 5, to extract the metallic matters from the inorganic wastes, so as to produce reusable metals.

In the preferred embodiment of the present invention, the waste lithium battery recovery system further comprises an electromagnetically heating device 9 electrically connected with the steam generating device 2, the water ion generating device 4, and the lithium battery processing device 5, and a controller 91 electrically connected with the electromagnetically heating device 9. The electromagnetically heating device 9 produces a heat energy by electromagnetic heating to heat the steam generating device 2, the water ion generating device 4, and the lithium battery processing device 5. The controller 91 controls and regulates heating parameters and motion statuses of the steam generating device 2, the water ion generating device 4, and the lithium battery processing device 5. For example, the controller 91 presets the heating time, the heat temperature, the flow quantity and flow speed of the saturated steam of the steam generating device 2, the flow quantity and flow speed of the water ions of the water ion generating device 4, the pressure of the supercharger 3, the flow quantity and flow speed of the condensate water of the condensate tank 6, or the operation status of the lithium battery processing device 5. It is noted that, the controller 91 includes a computer, a terminal, a server, a human/machine interface or an embedded system. In addition, the electromagnetically heating device 9 include coils which produce a magnetic field, with many eddy currents being formed between the magnetic field and the metallic pipes or containers, such that the metallic pipes or containers produce the heat energy. The electromagnetically heating device 9 is a traditional technology and will not be further described in details.

In the preferred embodiment of the present invention, the recovery processing device 8 processes the inorganic wastes by chemical neutralization, acid-base extraction, or smelting.

In the preferred embodiment of the present invention, the condensate tank 6 includes a spray tower 61 which receives and processes the waste gases of the condensate tank 6, so as to eliminate acid/alkali, heavy metal, chlorine, and carbon of the waste gases.

In the preferred embodiment of the present invention, the feeding device 1 processes the waste lithium batteries by steps of comminution, magnetic separation, milling, and spraying water.

In the preferred embodiment of the present invention, the comminution step includes breaking and decomposing the waste lithium batteries into small particles or lumps containing metallic substances.

In the preferred embodiment of the present invention, the magnetic separation step includes separating the metallic substances from the small particles or lumps by a magnetic force.

In the preferred embodiment of the present invention, the milling step includes milling (or grinding) the small particles or lumps into powders.

In the preferred embodiment of the present invention, the spraying water step includes spraying cooling water during the comminution step and the milling step, to avoid sputtering of the powder dust and the electrolyte, thereby preventing from causing an explosion during the comminution step and the milling step.

In the preferred embodiment of the present invention, the waste batteries are not only limited to the lithium batteries, but also include carbon-zinc batteries, alkaline manganese batteries, zinc batteries, mercury batteries, hydrogen batteries, magnesium-manganese batteries, alkaline batteries, lead-acid batteries, nickel-cadmium batteries, nickel-hydrogen batteries, lithium-ion batteries, lithium-ion polymer batteries, or lithium iron phosphate batteries.

In operation, the waste lithium batteries is delivered through the feeding device 1 into the lithium battery processing device 5 after performing the steps of comminution, magnetic separation, milling, and spraying water. At the same time, water is filled into the steam generating device 2 which heats the water to produce the saturated steam. The saturated steam of the steam generating device 2 is delivered into the supercharger 3 which heats the saturated steam into the superheated steam. The superheated steam of the supercharger 3 is delivered into the water ion generating device 4 which dissociates, and transforms the superheated steam into the water ions. The water ions of the water ion generating device 4 are delivered into the lithium battery processing device 5. The lithium battery processing device 5 performs the reactions of molecular scission, pyrolysis and carbonization, and the electrolytes and the separators of the waste lithium batteries are treated by the water ions to form the carbon residues, the gas-liquid wastes, and the inorganic wastes. The gas-liquid wastes of the lithium battery processing device 5 are delivered to the condensate tank 6, to produce the waste water and the waste gases. At this time, the spray tower 61 processes the waste gases of the condensate tank 6, so as to eliminate acid/alkali, sulfide, heavy metal, chlorine, and carbon of the waste gases. Thus, the condensate tank 6 recovers clean condensate water which is delivered to the steam generating device 2. The waste gases (such as alkane, lipid, ester, carbon oxide or the like) that cannot be treated by the spray tower 61 are delivered into the plasma exhaust device 7 which dissociates and burned the waste gases. Thus, the gas-liquid wastes of the lithium battery processing device 5 are processed by the condensate tank 6 and the plasma exhaust device 7, to form harmless gases and liquids. The inorganic wastes of the lithium battery processing device 5 are delivered to the recovery processing device 8 which processes the inorganic wastes, to produce the metals that are reused.

Accordingly, the waste lithium battery recovery system satisfies the requirement of environmental protection. In addition, the waste lithium battery recovery system satisfies will not produce pollution during the processes.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A waste lithium battery recovery system comprising:
 a feeding device configured to store and convey waste lithium batteries;
 a steam generating device configured to generate saturated steam;
 a supercharger connected with the steam generating device;
 a water ion generating device connected with the supercharger;
 a lithium battery processing device connected with the feeding device and the water ion generating device respectively;
 a condensate tank connected with the lithium battery processing device;
 a plasma exhaust device connected with the condensate tank; and a recovery processing device connected with the lithium battery processing device;

wherein:

the waste lithium batteries of the feeding device include electrolytes and separators;

the supercharger is configured to receive and heat the saturated steam of the steam generating device into a superheated steam;

the water ion generating device is configured to receive, disassociate, and transform the superheated steam of the supercharger into water ions;

the lithium battery processing device is configured to receive the waste lithium batteries of the feeding device and introduce the water ions of the water ion generating device;

the lithium battery processing device is configured to treat the water ions and the electrolytes and the separators of the waste lithium batteries under an atmospheric pressure and under an approximately anaerobic state by reactions of molecular scission, pyrolysis and carbonization, to form carbon residues, gas-liquid wastes, and inorganic wastes;

the condensate tank is configured to receive, cool, and separate the gas-liquid wastes of the lithium battery processing device to produce waste water and waste gases;

the plasma exhaust device is configured to receive the waste gas of the condensate tank and dissociate the waste gases by a predetermined voltage;

the recovery processing device is configured to receive and process the inorganic wastes of the lithium battery processing device to produce metals;

the waste lithium batteries are delivered through the feeding device into the lithium battery processing device;

the steam generating device is configured to heat water to produce the saturated steam;

the saturated steam of the steam generating device is delivered into the supercharger which heats the saturated steam into the superheated steam;

the superheated steam of the supercharger is delivered into the water ion generating device which dissociates and transforms the superheated steam into the water ions;

the water ions of the water ion generating device are delivered into the lithium battery processing device;

the lithium battery processing device is configured to perform the reactions of molecular scission, pyrolysis, and carbonization and the electrolytes and the separators of the waste lithium batteries are treated by the water ions to form the carbon residues, the gas-liquid wastes, and the inorganic wastes;

the gas-liquid wastes of the lithium battery processing device are delivered to the condensate tank to produce the waste water and the waste gases;

the waste gases are delivered into the plasma exhaust device which is configured to dissociate and burn the waste gases; and the inorganic wastes of the lithium battery processing device are delivered to the recovery processing device which is configured to process the inorganic wastes to produce the metals.

2. The waste lithium battery recovery system of claim 1, further comprising:

an electromagnetically heating device electrically connected with the steam generating device, the water ion generating device, and the lithium battery processing device; and a controller electrically connected with the electromagnetically heating device;

wherein:

the electromagnetically heating device is configured to produce a heat energy by electromagnetic heating; and the controller is programmed to control heating parameters of the steam generating device, the water ion generating device, and the lithium battery processing device.

3. The waste lithium battery recovery system of claim 1, wherein the recovery processing device is configured to process the inorganic wastes by chemical neutralization, acid-base extraction, or smelting.

4. The waste lithium battery recovery system of claim 1, wherein the condensate tank includes a spray tower configured to receive and process the waste gases of the condensate tank to eliminate acid/alkali, heavy metal, chlorine, and carbon of the waste gases.

5. The waste lithium battery recovery system of claim 1, wherein the feeding device is configured to process the waste lithium batteries by steps of comminution, magnetic separation, milling, and spraying water.

6. The waste lithium battery recovery system of claim 5, wherein
the comminution step includes breaking and decomposing the waste lithium batteries into small particles or lumps containing metallic substances.

7. The waste lithium battery recovery system of claim 6, wherein
the magnetic separation step includes separating the metallic substances from the small particles or lumps by a magnetic force.

8. The waste lithium battery recovery system of claim 7, wherein
the milling step includes milling the small particles or lumps into powders.

9. The waste lithium battery recovery system of claim 5, wherein
the spraying water step includes spraying cooling water during the comminution step and the milling step.

* * * * *